(12) United States Patent
Brennenstuhl et al.

(10) Patent No.: US 10,478,959 B2
(45) Date of Patent: Nov. 19, 2019

(54) HAND-HELD POWER TOOL

(71) Applicant: Robert Bosch GmbH, Stuttgart (DE)

(72) Inventors: Jens Brennenstuhl, Albershausen (DE); Michael Hoffmann-Sugland, Dortmund (DE); Stefan Mock, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/550,838

(22) PCT Filed: Feb. 25, 2016

(86) PCT No.: PCT/EP2016/053913
§ 371 (c)(1),
(2) Date: Aug. 14, 2017

(87) PCT Pub. No.: WO2016/135216
PCT Pub. Date: Sep. 1, 2016

(65) Prior Publication Data
US 2018/0029214 A1    Feb. 1, 2018

(30) Foreign Application Priority Data

Feb. 25, 2015   (DE) .................. 10 2015 203 350
Feb. 24, 2016   (DE) .................. 10 2016 202 831

(51) Int. Cl.
*B25F 3/00*    (2006.01)
*B23B 45/00*   (2006.01)

(52) U.S. Cl.
CPC .............. *B25F 3/00* (2013.01); *B23B 45/003* (2013.01); *B23B 45/008* (2013.01);
(Continued)

(58) Field of Classification Search
CPC ................. B23B 45/003; B23B 45/008; Y10T 279/3412; B25F 3/00
(Continued)

(56) References Cited

U.S. PATENT DOCUMENTS 4,103,511 A * 8/1978 Kress .................. B25F 3/00
                                                    29/560
5,928,241 A    7/1999 Menut et al.
(Continued)

FOREIGN PATENT DOCUMENTS

DE    10125418 A1   12/2002
DE    10109956 B4    4/2009
(Continued)

OTHER PUBLICATIONS

Machine translation, German Patent Document, DE 10109956, Abele, H., dated Apr. 9, 2009.*
(Continued)

*Primary Examiner* — Eric A. Gates
*Assistant Examiner* — Chwen-Wei Su
(74) *Attorney, Agent, or Firm* — Norton Rose Fulbright US LLP; Gerard Messina

(57) ABSTRACT

A hand-held power tool which includes a gear housing with a gear for transmitting a torque, generated by a drive motor, to a spindle. The gear housing is exchangeably connectable to a tool attachment via an interface in such a way that a torque is transmitted from the spindle to an input spindle of the tool attachment. The interface includes a housing-side interface element with a flange ring, which is connected to the gear housing in a torsionally stiff manner. The housing-side interface element corresponds to a tool attachment-side interface element which includes a fastening ring that is rotatably supported on the tool attachment. The fastening ring is brought into engagement with the flange ring by a coupled rotatory and axial relative movement of the fastening ring with respect to the flange ring so that the fastening ring and the flange ring together form a bayonet-type connector.

28 Claims, 8 Drawing Sheets

(52) U.S. Cl.
CPC ....... *B23B 2231/04* (2013.01); *B23B 2231/06* (2013.01); *Y10T 279/3412* (2015.01)

(58) Field of Classification Search
USPC .......................................................... 30/500
See application file for complete search history.

(56) References Cited

U.S. PATENT DOCUMENTS

| | | | | |
|---|---|---|---|---|
| 5,957,634 | A * | 9/1999 | Carpinetti | B23B 31/1071 279/143 |
| 6,551,037 | B2 | 4/2003 | Gifford et al. | |
| 6,582,164 | B1 * | 6/2003 | McCormick | B23B 31/113 408/144 |
| 7,491,020 | B2 * | 2/2009 | Gehret | B23B 31/1238 279/134 |
| 9,694,428 | B2 * | 7/2017 | Tussing | B25F 3/00 |
| 2013/0093142 | A1 * | 4/2013 | Saur | B23B 31/02 279/44 |
| 2013/0093149 | A1 * | 4/2013 | Saur | B25B 21/00 279/143 |
| 2014/0346744 | A1 | 11/2014 | Herr et al. | |
| 2015/0174670 | A1 * | 6/2015 | Steele | B23B 51/05 408/36 |

FOREIGN PATENT DOCUMENTS

| | | |
|---|---|---|
| DE | 102012007958 A1 | 10/2013 |
| DE | 202013102832 U1 | 12/2013 |
| DE | 102013213804 A1 | 5/2014 |
| EP | 2338644 A2 | 6/2011 |
| EP | 2745992 A2 | 6/2014 |
| JP | S60113846 U | 8/1985 |

OTHER PUBLICATIONS

International Search Report dated May 23, 2016, of the corresponding International Application PCT/EP2016/053913 filed Feb. 25, 2016.

* cited by examiner

HAND-HELD POWER TOOL

FIELD

The present invention relates to a hand-held power tool, a tool attachment for a hand-held power tool, as well as a tool system that includes a hand-held power tool, and a tool attachment.

BACKGROUND INFORMATION

Hand-held power tools, such as cordless screw drills or drills, are conventional. To increase the possible applications for a hand-held power tool such as a screwdriver or screw drill, a tool attachment is detachably mounted on the hand-held power tool. Thus, for example, conventional angle attachments have an output shaft that is situated at an angle with respect to the drive shaft of the hand-held power tool. Furthermore, in conventional eccentric attachments, the output shaft is offset in parallel to the drive shaft of the hand-held power tool.

Various types of fastenings are available for detachably mounting a tool attachment on the housing of a hand-held power tool.

German Patent Application No. DE 101 09 956 B4 describes a hand-held power tool including exchangeable tool attachments that are fastened to the tool via a bayonet joint. It is disadvantageous that the bayonet joint cannot be locked, so that it may come loose by itself due to vibrations occurring during operation of the hand-held power tool. This may result in damage to the tool attachment and/or the hand-held power tool, as well as injury to a user of the hand-held power tool. In addition, it has been found disadvantageous that there is no unambiguous, reproducible angular position of the locking element with respect to the tool housing in the locking state of the bayonet joint, so that the locking state cannot be unequivocally indicated.

German Patent Application No. DE 20 2013 102 832 U1 describes an option for locking the connection of a tool attachment to a gear housing of a hand-held power tool; however, the axial locking of the tool attachment is achieved here with the aid of a ball that engages with a circumferential groove in the spindle of the power tool. With respect to the implementation with the aid of a bayonet joint, this in turn has the disadvantage that a large tilting clearance occurs in the interface between the tool attachment and the gear housing, which is undesirable.

German Patent Application No. DE 10 2013 213 804 A1 describes a hand-held power tool that includes a fastening interface, designed as a bayonet joint, for accommodating a tool attachment, it being possible to lock the fastening interface via a blocking element. In this approach as well, it is disadvantageous that there is no unambiguous, reproducible angular position of the locking element with respect to the gear housing, so that the locking state cannot be unequivocally indicated.

SUMMARY

An object of the present invention is to address the above-mentioned disadvantages and provide a novel tool attachment for fastening to an interface of a hand-held power tool, in which the interface between the gear housing and the tool attachment is lockable with minimal play, and in which the locking state of the interface in an unambiguous angular position is indicated to the user in a simple, unequivocal manner.

This object may be achieved by a hand-held power tool, a tool attachment for a hand-held power tool, and a tool system, in accordance with the present invention. Advantageous embodiments, variants, and refinements of the present invention are described herein.

According to the present invention, it is provided that a hand-held power tool includes a gear housing with a gear for transmitting a torque, generated by a drive motor, to a spindle that rotates about a rotation axis x and defines an axial direction x, the gear housing being exchangeably connectable to a tool attachment via a housing-side interface element in such a way that a torque is transmitted from the spindle to an input spindle of the tool attachment. The housing-side first interface element includes a flange ring, the flange ring being connected to the gear housing in a torsionally stiff manner, and the housing-side interface element corresponds to a tool attachment-side second interface element which includes a fastening ring that is rotatably supported on the tool attachment. In addition, the fastening ring is to be brought into engagement with the flange ring by a coupled rotatory and axial relative movement of the fastening ring with respect to the flange ring in such a way that the fastening ring and the flange ring together form a bayonet-type connector.

The tool attachment-side second interface element also preferably includes a detent ring, the bayonet-type connector being lockable by rotating the fastening ring with respect to the detent ring.

Accordingly, according to the present invention a bayonet-type connector is used in the interface between the gear housing and the tool attachment. As the result of the housing-side first interface element and the tool attachment-side second interface element being guided axially relative to one another in a bayonet-type connector, the interface has a very small tilting clearance. In addition, due to the arrangement according to the present invention of a detent ring on the tool attachment-side second interface element, the sought locking of the bayonet-type connector is achieved.

In one preferred specific embodiment, the flange ring has at least one beveled undercut that extends in the circumferential direction of the flange ring and has a variable slope, at least one corresponding undercut element on the fastening ring engaging with the undercut in the manner of a bayonet joint when the bayonet-type connector is set up, and when a rotation of the fastening ring is applied, the undercut element being guided along the slope of the beveled undercut in such a way that an axial motion component of the fastening ring with respect to the flange ring is brought about in a first defined angular range of the rotation. Due to the variability in the slope, a different relationship between the rotary motion and the axial motion component may be achieved.

In one alternative preferred specific embodiment, the fastening ring includes at least one beveled second undercut, the second undercut extending in the circumferential direction of the fastening ring and having a variable slope, at least one corresponding second undercut element on the flange ring engaging with the second undercut in the manner of a bayonet joint when the bayonet-type connector is set up, and when a rotation of the fastening ring is applied, the second undercut element being guided along the slope of the beveled second undercut in such a way that an axial motion component of the fastening ring with respect to the flange ring is brought about in a first defined angular range of the rotation.

The variable slope of the beveled undercut is preferably designed in such a way that in a second defined angular range of the rotation, the rotation applied to the fastening ring does not bring about an axial motion component of the fastening ring with respect to the flange ring. For a beveled undercut having a constant slope, which effectuates an axial motion component for all rotation angles, at an angle that is a function of the manufacturing tolerances of various involved assemblies, bracing of the housing-side first interface element with respect to the tool attachment-side second interface element occurs, which in principle is desirable, since this bracing imparts stability to the interface and removes play from the interface. However, it is disadvantageous that, due to the mentioned manufacturing tolerances, it is not possible to precisely set the rotation angle at which the bracing begins. As a result, the desired locking of the bayonet-type connector cannot be made in an unambiguous, reproducible angular position of the locking element with respect to the gear housing, since at an unintended rotation angle the bracing may become so great that further rotation in the direction of the intended locking position is no longer possible.

Due to the second defined angular range of the rotation provided here, in which a rotation applied to the fastening ring does not bring about an axial motion component of the fastening ring with respect to the flange ring, it is possible to rotate the tool attachment-side second interface element with respect to the housing-side first interface element without increasing the axial bracing of the two components. A defined angular position of the locking element with respect to the gear housing may thus be selected in which the locking of the bayonet-type connector may also be carried out.

According to one preferred embodiment of the present invention, the detent ring as well as the fastening ring are rotatably supported on the tool attachment, and the housing-side first interface element includes at least one element that nonrotatably fixes the detent ring with respect to the flange ring when the fastening ring is engaged with the flange ring.

The detent ring preferably has at least one first recess that cooperates with at least one corresponding detent element of the fastening ring in such a way that when the bayonet-type connector is set up, the detent element engages with the first recess at a defined rotation angle of the fastening ring with respect to the detent ring, thus achieving the locking of the fastening ring with respect to the detent ring.

In one advantageous specific embodiment, the detent ring has at least one second recess that cooperates with at least one detent element of the fastening ring in such a way that when the bayonet-type connector is released, the detent element engages with the second recess at a defined rotation angle of the fastening ring with respect to the detent ring, thus achieving anti-twist protection of the fastening ring with respect to the detent ring when the housing-side first interface element and the tool attachment-side second interface element are not engaged with one another.

In one preferred specific embodiment, the second defined angular range of the rotation corresponds to a range that extends from the engagement of the detent element with the first recess to a rotation of the fastening ring with respect to the detent ring about a defined rotation angle, and the first defined angular range of the rotation corresponds to the remaining rotation angles of the fastening ring with respect to the detent ring until the engagement of the detent element with the second recess.

The housing-side first interface element advantageously includes at least one rib element that may be brought into engagement with at least one corresponding detent lug of the tool attachment-side second interface element in such a way that the tool attachment is nonrotatably fixed with respect to the gear housing when the bayonet-type connector is set up. In this way, a torque acting on the tool attachment, which may result, for example, from an output spindle of the tool attachment that is eccentric or tilted with respect to the output spindle of the hand-held power tool, may be absorbed by the gear housing.

Moreover, in accordance with the present invention, the object described above may achieved by a tool attachment for a hand-held power tool, the tool attachment being exchangeably connectable to the hand-held power tool via a tool attachment-side interface element in such a way that a torque is transmitted from a spindle of the hand-held power tool to an input spindle of the tool attachment. The tool attachment-side interface element includes a fastening ring that is rotatably supported on the tool attachment, the tool attachment-side second interface element being connectable to a housing-side first interface element, the housing-side first interface element preferably including a flange ring. The flange ring is connected to a gear housing of the hand-held power tool in particular in a torsionally stiff manner, for the purpose of which the fastening ring is to be brought into engagement with the housing-side interface element, in particular the flange ring, by a coupled rotatory and axial relative movement of the fastening ring with respect to the housing-side interface element, in particular the flange ring, in such a way that the fastening ring and the housing-side interface element, in particular the flange ring, together form a bayonet-type connector.

The tool attachment-side second interface element preferably also includes a detent ring, the bayonet-type connector being lockable by rotating the fastening ring with respect to the detent ring.

As a result of the locking taking place between the fastening ring and the detent ring, which are both components of the tool attachment-side second interface element, i.e., both are situated on the tool attachment, for the locking it is entirely irrelevant how the tool attachment is oriented with respect to the gear housing. As a result, in addition to the simple implementation of the locking, the synergistic effect is inherently achieved in that the locking of the bayonet-type connector may be indicated to the user in a simple and unequivocal manner.

The rotation of the fastening ring advantageously takes place via a locking ring that is supported on the tool attachment concentrically with respect to the fastening ring and rotatably fixedly connected to the fastening ring. In addition to its function as a working point for the user, the locking ring also protects the fastening ring from the outside and prevents the penetration of dirt, etc., into the tool attachment-side second interface element.

The fastening ring is preferably supported on the tool attachment in such a way that it is resilient in the axial direction, so that when the bayonet-type connector is set up and the associated axial relative movement between the fastening ring and the flange ring takes place, the housing-side first interface element and the tool attachment-side second interface element are axially pretensioned against one another. As mentioned above, a certain axial bracing of the interface is desirable, since the interface thus has less play. The resilient support of the fastening ring is effectuated in particular by at least one spring element.

In one preferred specific embodiment, the resilient support takes place via an elastomer element and/or a spring, a detent lug of the tool attachment-side second interface element advantageously being connected to the fastening ring via a spring element in such a way that the detent lug is pretensioned against the first interface element when the bayonet-type connector is set up. However, the spring element may also be a coil spring designed as a compression spring or tension spring.

The tool attachment is advantageously designed as a drill chuck tool holder, as a right angle tool holder, as an eccentric tool holder, as a drill bit holder attachment, as a rotary percussion drill attachment, as an impact drill attachment, as a drill hammer attachment, or as a torque attachment. Alternatively, the tool attachment may have some other function that appears meaningful to those skilled in the art to form a power blower attachment, a cartridge gun attachment, or a pipe pressing attachment, for example.

In another specific embodiment, a indicating device is provided on the tool attachment, which indicates the unlocked and locked locking states of the bayonet-type connector, regardless of the tool attachment used, regardless of the angular position of the tool attachment with respect to the gear housing, and regardless of the angular position of the indicating device of the tool attachment with respect to the remainder of the tool attachment, the indicating device preferably including a first indicating notch and a second indicating notch in the locking ring, and a first symbol on the detent ring which is visible through the center of the first indicating notch only when the detent element of the fastening ring is engaged with the first recess, and which is visible through the center of the second indicating notch only when the detent element of the fastening ring is engaged with the second recess. In this way, the user quickly obtains information about the locking state of the joint.

In one alternative preferred specific embodiment, the indicating device includes a first indicating notch in the locking ring, and a first symbol and a second symbol on the detent ring, the first symbol being visible through the center of the first indicating notch only when the detent element of the fastening ring is engaged with the first recess, and the second symbol being visible through the center of the indicating notch only when the detent element of the fastening ring is engaged with the second recess.

In addition to the tool attachment-side second interface element, the tool attachment also advantageously includes an auxiliary interface designed in the manner of the housing-side first interface element of the hand-held power tool, so that an additional tool attachment may be adapted at the auxiliary interface, and it is thus possible to operate multiple tool attachments situated in succession on the gear housing and connected to one another by bayonet-type connectors.

In one particularly preferred specific embodiment, an input bearing bush is also provided on the tool attachment, the input bearing bush at its inner circumference accommodating the input spindle of the tool attachment, and along its outer circumference being encompassed in sections by a centering sleeve of the input spindle and by sections of the housing of the tool attachment, so that simultaneous centering of the housing of the tool attachment and of the interface element takes place due to the input bearing bush.

Moreover, the object mentioned at the outset is achieved by a tool system that includes a hand-held power tool and a tool attachment, the hand-held power tool including a gear housing with a gear for transmitting a torque, generated by a drive motor, to a spindle that rotates about a rotation axis, the spindle defining an axial direction. The gear housing is exchangeably connectable to the tool attachment via an interface in such a way that a torque is transmitted from the spindle to an input spindle of the tool attachment. The interface includes a housing-side first interface element with a flange ring, the flange ring being connected to the gear housing in a torsionally stiff manner, and the housing-side first interface element corresponding to a tool attachment-side second interface element which includes a fastening ring that is rotatably supported on the tool attachment. The fastening ring is to be brought into engagement with the flange ring by a coupled rotatory and axial relative movement of the fastening ring with respect to the flange ring in such a way that the fastening ring and the flange ring together form a bayonet-type connector. According to the present invention, it is provided that the second interface element also includes a detent ring, the bayonet-type connector being lockable by rotating the fastening ring with respect to the detent ring.

In another specific embodiment, the housing-side first interface element includes at least one rib element that may be brought into engagement with at least one corresponding detent lug of the second interface element in such a way that the tool attachment is nonrotatably fixed with respect to the gear housing when the bayonet-type connector is set up.

As described above, a torque acting on the tool attachment, which may result, for example, from an output spindle of the tool attachment that is eccentric or tilted with respect to the output spindle of the hand-held power tool, may thus be absorbed by the gear housing.

In the locked state of the bayonet-type connector, the tool attachment may preferably be pulled away from the gear housing in the axial direction, against the pretensioning force of a spring element, so that the engagement between the detent lug and the rib element is discontinued and a rotation of the tool attachment with respect to the gear housing is made possible. Thus, the bayonet-type connector does not have to be released in order to allow a rotation of the tool attachment with respect to the gear housing, which may be desirable for certain tool attachments such as a right angle tool holder or an eccentric tool holder.

In general, hand-held power tools are understood to mean, for example, baton screwdrivers, percussion drills, multi-function tools, screw drills, cordless drills, cordless screwdrivers, and/or cordless screw drills. The hand-held power tool includes a gear for transmitting a torque, generated by a drive motor, to a drive shaft, and various tools such as drills, bit holders, or drill bits may be used on the tool attachment.

In the present context, "transmission of electrical energy" is understood to mean that the hand-held power tool delivers power to the drive motor via a power cord connection to the body and/or via a rechargeable battery in the housing.

Further features, applications, and advantages of the present invention result from the following description of the exemplary embodiments of the present invention, which are illustrated in the figures. It is to be noted that the illustrated features are only descriptive in nature, and may also be used in combination with features of other refinements described above, and are not intended to limit the present invention in any way.

BRIEF DESCRIPTION OF THE DRAWINGS

The present invention is explained in greater detail below with reference to preferred exemplary embodiments; the same reference numerals are used for identical features.

DETAILED DESCRIPTION OF EXAMPLE EMBODIMENTS

Figure 1:
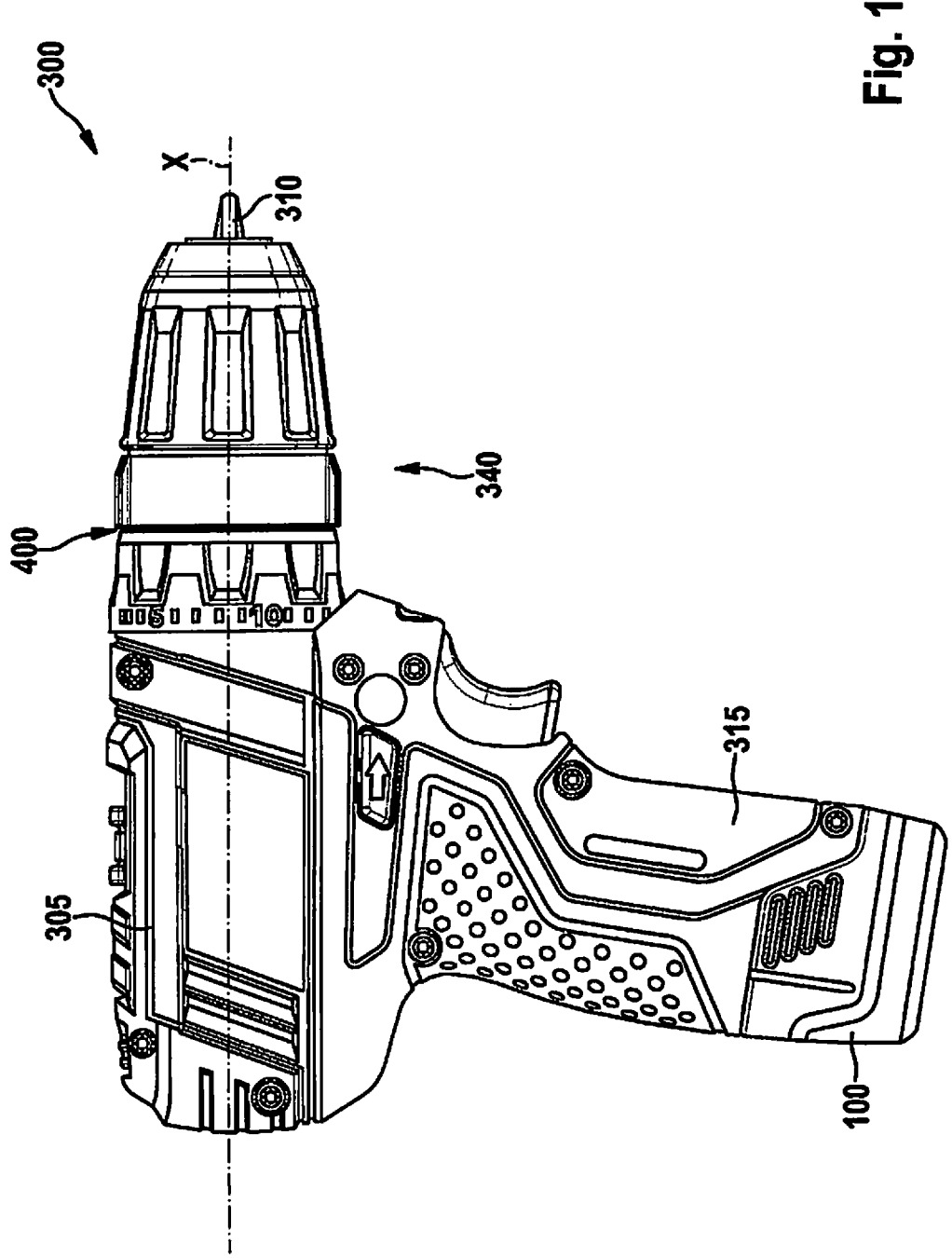
FIG. 1 shows by way of example a side view of a hand-held power tool according to the present invention together with a tool attachment according to the present invention.
Figure 2:
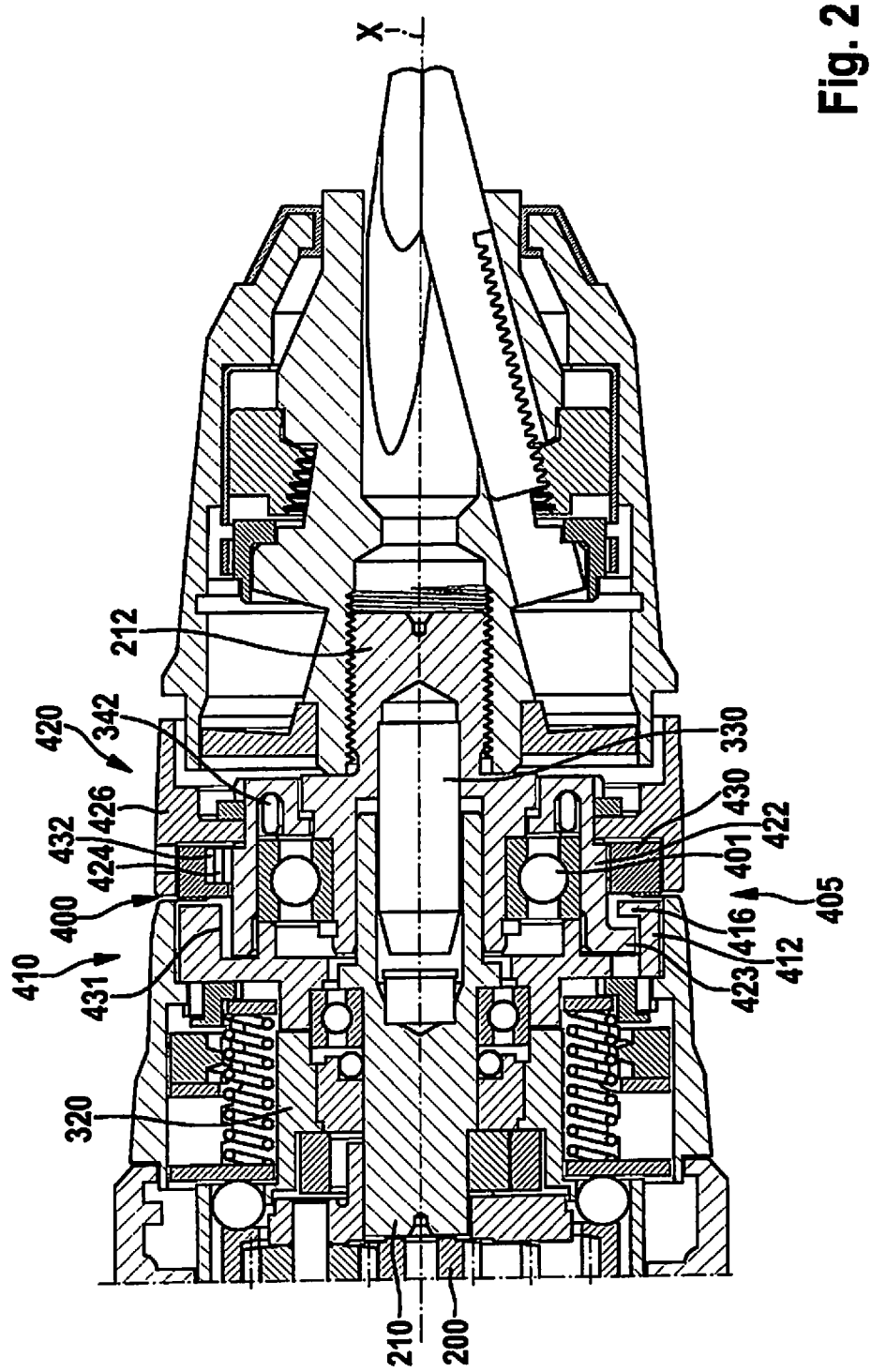
FIG. 2 shows a sectional view of a hand-held power tool and a tool attachment that is fastened to an interface, in a first specific embodiment.

FIG. 1 illustrates an electrical device designed as a hand-held power tool 300. According to the illustrated specific embodiment, hand-held power tool 300 is mechanically and electrically connectable to rechargeable battery pack 100 for supplying power independently of the power grid. The hand-held power tool includes a handle 315 on which rechargeable battery pack 100 is situated in a locked manner. Hand-held power tool 300 is designed as a cordless screw drill as an example in FIG. 1. However, it is pointed out that the present invention is not limited to cordless screw drills, and instead may be used for various hand-held power tools 300 that are operated with electrical power. Hand-held power tool 300 includes a base body 305 that includes a gear housing 320 (FIG. 2). A tool attachment 340 is exchangeably connected at gear housing 320 via an interface 400. In the present case, tool attachment 340 is designed as a drill chuck tool holder that includes a tool receptacle 310 for accommodating a drill bit or a screwdriver bit.

FIG. 2 illustrates a sectional view of hand-held power tool 300 in the area of interface 400. The locked locking state is illustrated, in which gear housing 320 and tool attachment 340 are connected to one another via interface 400.

Figure 8:
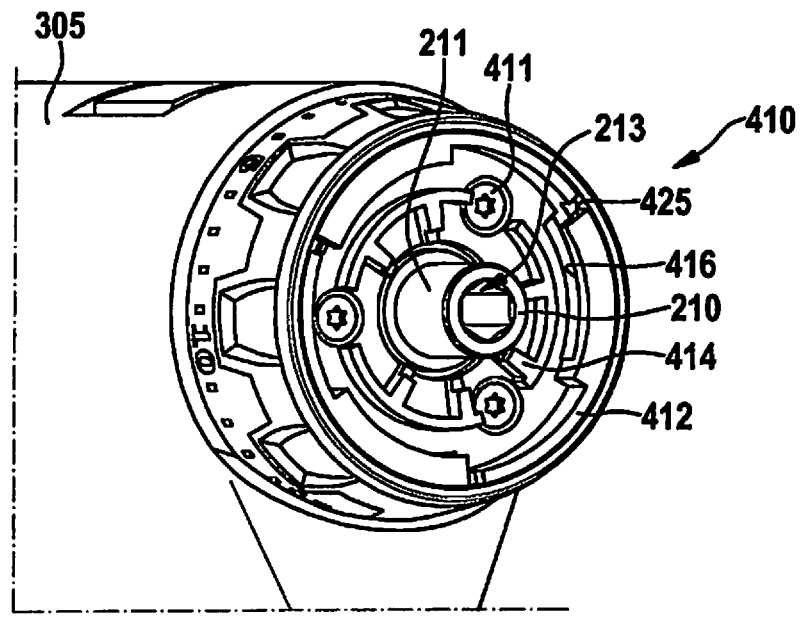
FIG. 8 shows a perspective view of a hand-held power tool together with a housing-side first interface element of the interface.

FIG. 2 shows a portion of gear 200 of hand-held power tool 300, and a spindle 210 which leads out from the gear in an axial direction x and which is rotationally driven about tool axis x by a drive motor, not illustrated. The free end of spindle 210 has a cylindrical external geometry 211 and a tool receptacle 213 in the form of a hexagon socket receptacle (FIG. 8). Tool receptacle 213 is designed for accommodating an insert tool having a hexagon head profile, for example a screwdriver bit. Hand-held power tool 300 may thus be used as a stand-alone hand-held power tool 300 without mounting tool attachment 340. The torque acting on spindle 210 is transmitted via a suitable adapter 330, for example a hexagon head adapter, to an input spindle 212 of tool attachment 340 in order to drive the particular mechanism on the tool attachment side. Adapter 330 is fixedly connected to input spindle 212 of tool attachment 340. Adapter 330 of tool attachment 340 is detachably connected to spindle 210 of hand-held power tool 300. The free end of adapter 330 is inserted into tool receptacle 213 when tool attachment 340 is mounted on hand-held power tool 300. The transmission of torque from hand-held power tool 300 to tool attachment 340 takes place via the particular hexagon profile of tool receptacle 213 and of adapter 330. In the illustrated case, input spindle 212 transmits the rotation to the drill chuck. Further mechanisms are described below in conjunction with FIGS. 4, 5, and 10.

It is also apparent that interface 400 includes a housing-side first interface element 410 with a flange ring 412 that is connected to gear housing 320 in a torsionally stiff manner, and a tool attachment-side second interface element 420 with a fastening ring 422 that is rotatably supported on tool attachment 340. In the illustrated specific embodiment, housing-side interface element 410 is rotatably fixedly connected to gear housing 320 with the aid of three fastening elements 411, for example fastening screws. For this purpose, housing-side interface element 410 has three through openings 413 for accommodating fastening elements 411.

The rotation of fastening ring 422 by a user takes place via a locking ring 426, which is supported on tool attachment 340 concentrically with respect to fastening ring 422 and connected to fastening ring 422 in a torsionally stiff manner.

Fastening ring 422 and flange ring 412 are engaged with one another in such a way that together they form a bayonet-type connector 405. Bayonet-type connectors are conventional, and are characterized in that when the two interface edges of the connection are engaged, a rotatory relative movement of the interface edges is coupled to an axial relative movement of the interface edges. In the illustrated specific embodiment, as a result of bayonet-type connector 405, first interface element 410 and second interface element 420 are guided toward one another in the axial direction when fastening ring 422 is screwed into flange ring 412.

Figure 3:
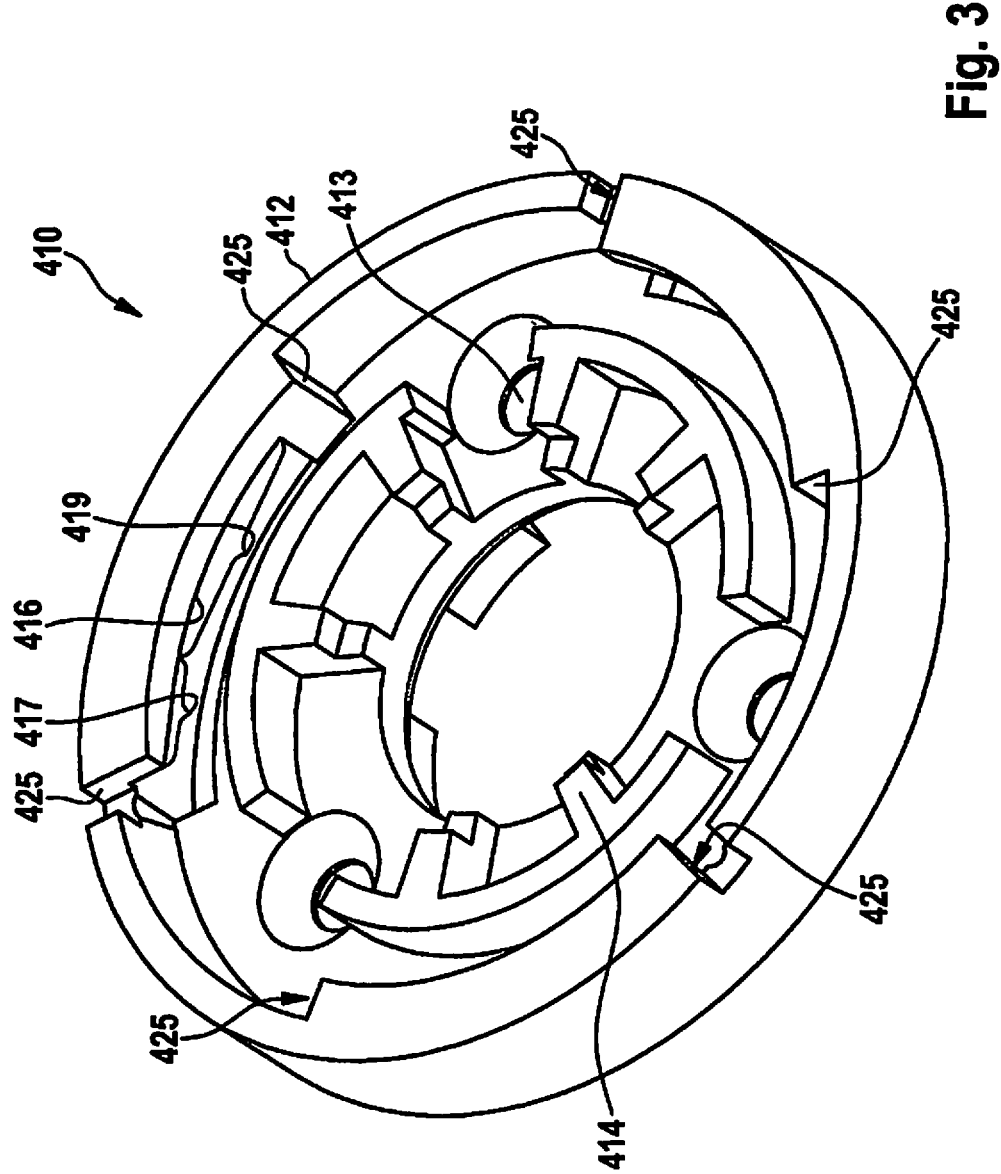
FIG. 3 shows a perspective view of a flange ring.

With reference to FIGS. 3 and 8, this is achieved in that flange ring 412 has at least one, in the illustrated case three, beveled undercuts 416 that extend in the circumferential direction of flange ring 412 and have a variable slope in the circumferential direction. When bayonet-type connector 405 is set up, at least one corresponding undercut element 423 on fastening ring 422, illustrated in FIG. 2, engages with undercut 416. When a rotation is applied to fastening ring 422, in a first defined angular range 417 of the rotation, undercut element 423 is guided along the slope of beveled undercut 416 in such a way that an axial motion component of fastening ring 422 with respect to flange ring 412 is brought about. When the joint is set up, second interface element 420 is thus moved toward first interface element 410, and when the joint is released, in contrast second interface element 420 is moved away from first interface element 410. In the illustrated specific embodiment, first defined angular range 417 corresponds to the area between the unlocked locking state and a first rotation angle, for example 5°, in the direction of the locked locking state. First angular range 417 is formed by a rising contact surface of undercut 416. First angular range 417 may extend in a range of 3° to 60°. The slope in first angular range 417 may be 0.5° to 10°, tool axis x forming the reference axis for the slope angle. In one alternative specific embodiment, it is provided that beveled undercut 416 is situated not on flange ring 412, but, rather, on fastening ring 422, while corresponding undercut element 423 is provided on flange ring 412 and not on fastening ring 422. In this specific embodiment, fastening ring 422 thus has at least one beveled second undercut that extends in the circumferential direction of fastening ring 422 and has a variable slope, at least one corresponding undercut element 423 on flange ring 412 engaging with the second undercut in the manner of a bayonet joint when bayonet-type connector 405 is set up, and when a rotation is applied to fastening ring 422, corresponding undercut element 423 is guided along the slope of the beveled second undercut in such a way that an axial motion component of fastening ring 422 with respect to flange ring 412 is brought about in a first defined angular range of the rotation.

In one alternative specific embodiment, flange ring 412 as well as fastening ring 422 each have at least one such beveled undercut 416.

The variable slope of beveled undercut 416 is designed in such a way that the rotation that is applied to fastening ring 422 in a second defined angular range 419 of the rotation brings about no axial motion component of fastening ring 422 with respect to flange ring 412. In second angular range 419, undercut 416 has no slope. Second angular range 419 is formed by an essentially flat contact surface of undercut 416. In the illustrated exemplary embodiment, second defined angular range 419 corresponds to the area between the locked locking state and a second rotation angle, for example 5°, in the direction of the unlocked locking state. Due to second defined angular range 419 of the rotation, in which a rotation applied to the fastening ring brings about no axial motion component of the fastening ring with respect to the flange ring, it is possible for the second interface element to rotate with respect to the first interface element without increasing the axial bracing of the two components. A defined angular position of the locking element with respect to the gear housing may thus be selected in which the locking of bayonet-type connector 405 may also be carried out. Bracing or blocking of bayonet-type connector 405 at a rotation angle that does not correspond to the intended locking position, which may be the case with conventional undercuts having a constant slope, due to manufacturing tolerances is thus largely excluded.

Second angular range 419 may extend in a range of 5° to 85°.

Figure 11:
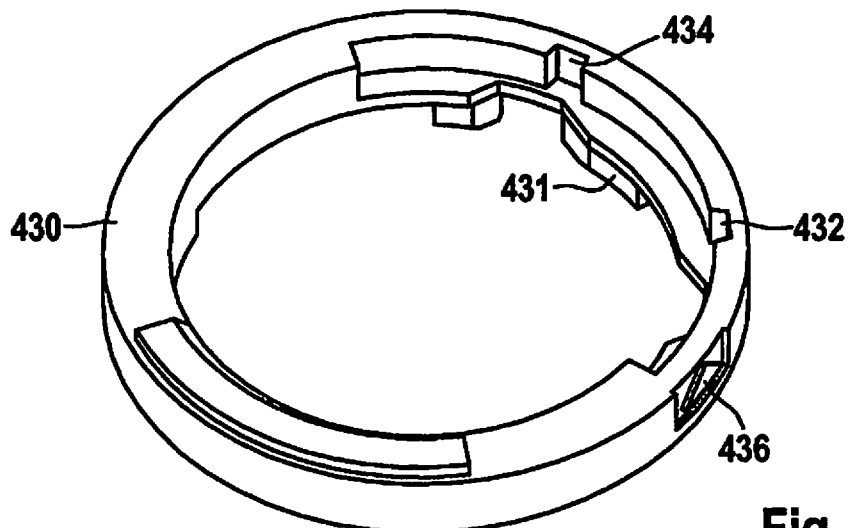
FIG. 11 shows a perspective view of a detent ring.

FIG. 2 also illustrates a detent ring 430, shown in detail in FIG. 11. Detent ring 430, as well as fastening ring 422, is rotatably supported on tool attachment 340. Detent ring 430 is used for achieving locking of bayonet-type connector 405 in the locked locking state. According to the present invention, this is achieved in that fastening ring 422 is rotated with respect to detent ring 430. This results in the option for locking fastening ring 422 with respect to detent ring 430. In the present specific embodiment, for this purpose housing-side first interface element 410 includes at least one fixing element 425 that nonrotatably fixes detent ring 430 with respect to flange ring 412 when fastening ring 422 is engaged with flange ring 412. In the illustrated specific embodiment, six such fixing elements 425 are formed by end face-side areas of undercuts 416, and nonrotatably fix detent ring 430 in the area of corresponding axially projecting protrusions 431 of detent ring 430, in particular in the area of side surfaces of the axial protrusions.

When fastening ring 422 is now brought into engagement with flange ring 412 and rotated with respect to flange ring 412, a rotation of fastening ring 422 with respect to detent ring 430 also automatically takes place, since the detent ring is rotatably fixedly held on first interface element 410 by fixing elements 425 (see above). In the present specific embodiment, the locking of fastening ring 422 with respect to detent ring 430 in the locked locking state takes place via a detent element 424 that is situated on fastening ring 422 and that engages with a first recess 432, situated on detent ring 430 when bayonet-type connector 405 is set up at a defined rotation angle of fastening ring 422 with respect to detent ring 430, which corresponds to the locked locking state of bayonet-type connector 405. Detent element 424 may, for example, be a cam of a detent spring or an elastically supported ball.

Figure 9:
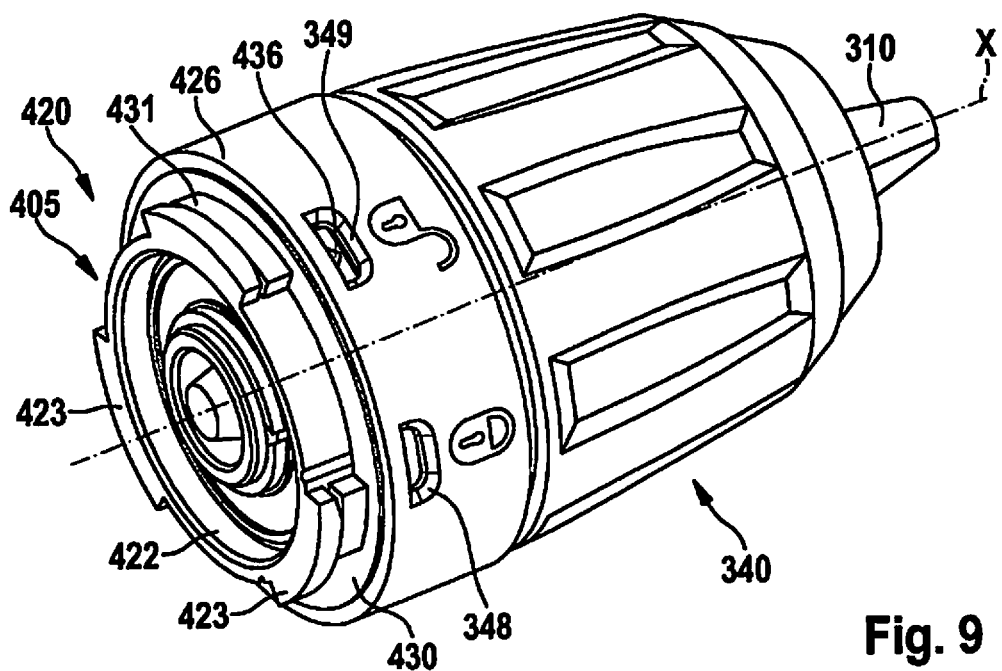
FIG. 9 shows a perspective view of a tool attachment together with a tool attachment-side second interface element of the first interface.

When the locking is released by an applied rotation of fastening ring 422, the resistance of detent element 424 is overcome, which disengages the detent element from first recess 432 and enables the rotation of fastening ring 422 relative to detent ring 430. In the angular position of fastening ring 422 with respect to detent ring 430, in which undercut element 423 is enabled by undercut 416 and bayonet-type connector 405 is released, which accordingly corresponds to the unlocked locking state of bayonet-type connector 405, detent element 424 engages with a second recess 434. Anti-twist protection of fastening ring 422 with respect to detent ring 430 is thus achieved when first interface element 410 and second interface element 420 are not engaged with one another. This configuration is also apparent in FIG. 9, where three protrusions 431 of detent ring 430 and undercut elements 423 of fastening ring 422 are congruently situated axially in succession in such a way that engagement with undercuts 416 of flange ring 412 is made possible.

In the specific embodiment illustrated in FIG. 2, interface 400 includes a bearing 401 that is an integral part of second interface element 420 and against which first interface element 410 is supported due to the axial relative displacement component of second interface element 420 with respect to first interface element 410 when bayonet-type connector 405 is set up. In the present specific embodiment, fastening ring 422 is also resiliently supported on tool attachment 340 in the axial direction, so that first interface element 410 and second interface element 420 are axially braced against one another when bayonet-type connector 405, and the associated axial relative movement between fastening ring 422 and flange ring 412, are set up. Such axial pretensioning ensures that the tilting clearance of interface 400 is largely eliminated.

In the specific embodiment shown in FIG. 2, this resilient support is designed as a ring-shaped elastomer element 342 by way of example. Another option for implementing the resilient support is a spring 344, as shown in FIG. 4.

Figure 4:
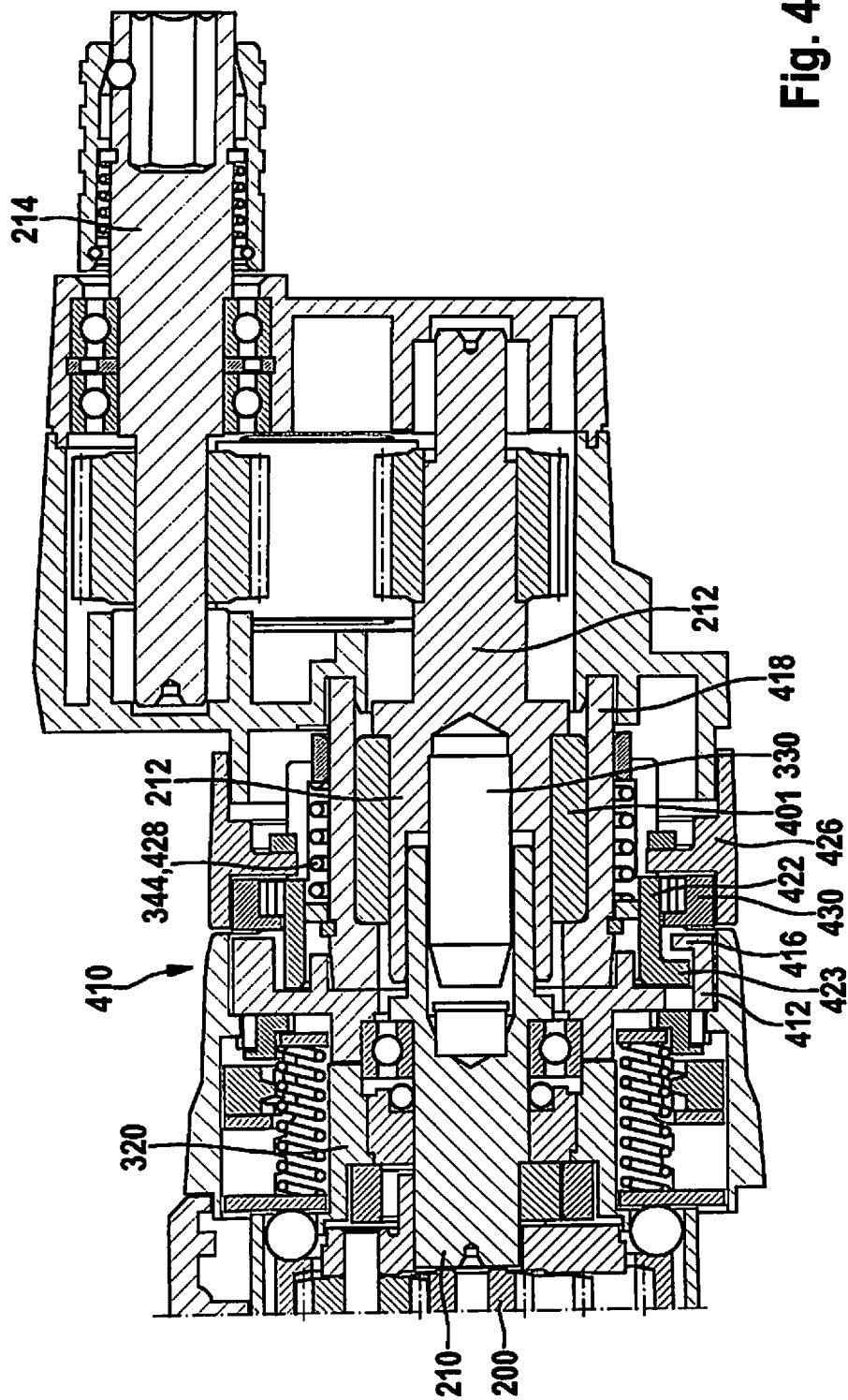
FIG. 4 shows a sectional view of a hand-held power tool and a tool attachment that is fastened to the interface, in a second specific embodiment.

In the specific embodiment illustrated in FIG. 4, an output spindle 214 is offset in parallel to input spindle 212, so that a torque must be absorbed by interface 400 during operation. For this purpose, first interface element 410 includes at least one rib element 414, illustrated in FIG. 3, which may be brought into engagement with at least one corresponding detent lug 418 of second interface element 420 in such a way that tool attachment 340 is nonrotatably fixed with respect to gear housing 320 when bayonet-type connector 405 is set up. Six rib elements 414 are provided in the specific embodiment illustrated in FIG. 3. In the illustrated specific embodiment, sixteen detent lugs 418, corresponding to the six rib elements 414, are part of a sleeve-shaped structure, which also has the function of a centering sleeve about bearing 401.

When bayonet-type connector 405 is locked, due to the axial displacement component between first interface element 410 and second interface element 420, detent lugs 418 are now brought into engagement with rib elements 414 and are pretensioned against first interface element 410 by a spring element 428, which in the illustrated specific embodiment simultaneously has the function of resiliently supporting fastening ring 422, and is designed as a coil spring.

While detent lugs 418 can no longer be rotated against first interface element 410 after engaging with rib elements 414, fastening ring 422 is still rotatable with respect to first interface element 410, so that, as described above, bayonet-type connector 405 may be locked and fixed by rotating fastening ring 422 with respect to flange ring 412.

As the result of detent lugs 418 being resiliently pretensioned against first interface element 410, in the locked state of bayonet-type connector 405 it is possible for tool attachment 340 to be pulled away from gear housing 320 in axial direction x, against the pretensioning force of spring element 428, so that the engagement between detent lugs 418 and rib elements 414 is discontinued and a rotation of tool attachment 340 with respect to gear housing 320 is made possible.

Figure 5:
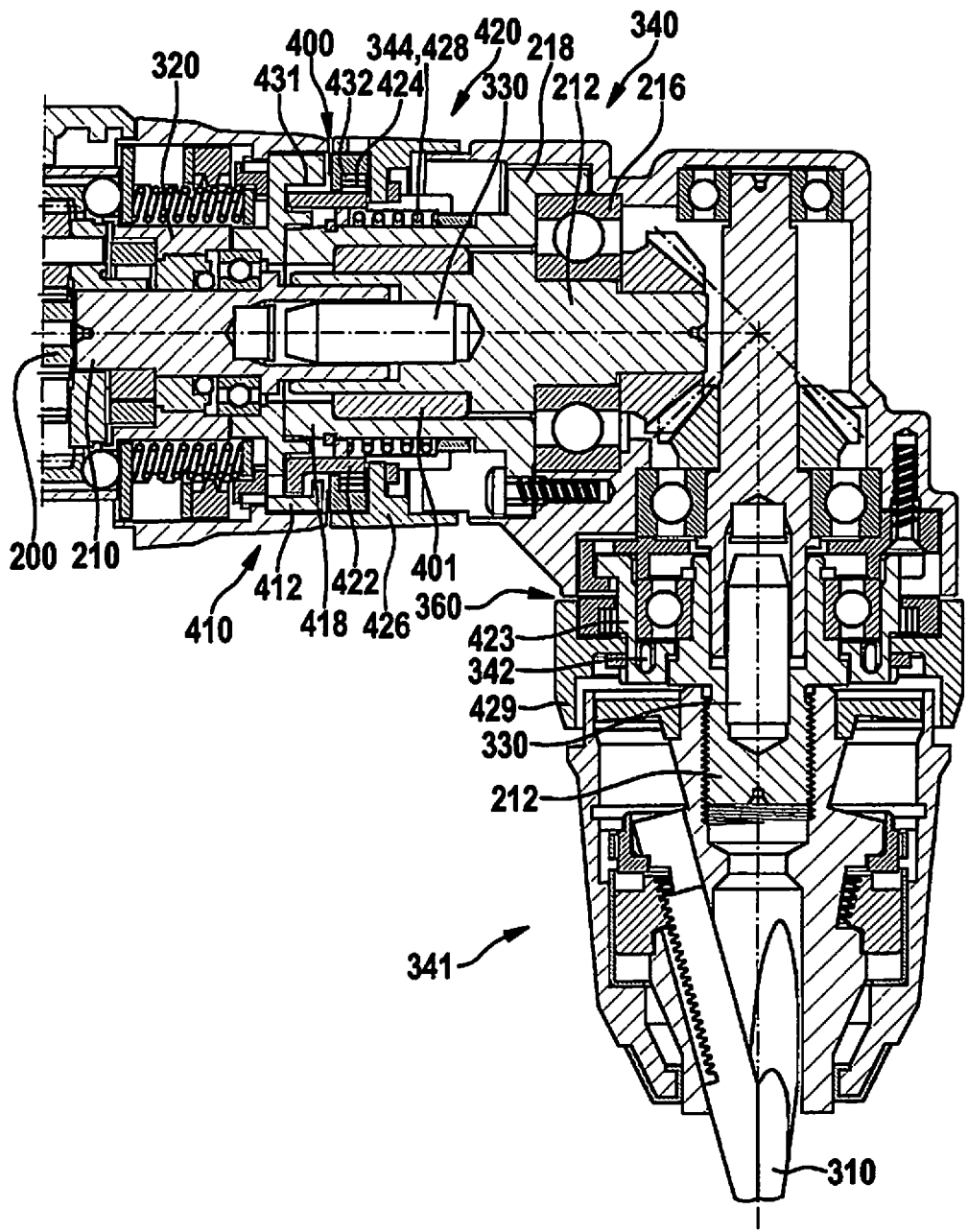
FIG. 5 shows a sectional view of a hand-held power tool and a tool attachment that is fastened to the interface, and a second tool attachment that is fastened to a second interface, in a first specific embodiment.

A rotation of tool attachment 340 with respect to gear housing 320 is desirable, for example, in order to increase the working ergonomics in certain situations. Thus, when a right angle tool holder, as illustrated in FIG. 5, is used it is often necessary to change the direction in which the right angle of tool attachment 340 protrudes from gear housing 320. With the present invention it is possible to make this change in direction by discontinuing the engagement, as described above, between detent lugs 418 and rib elements 414 without having to release the locking of bayonet closure device 405. Separating the two mechanisms thus assists with an efficient and ergonomic work procedure.

Figure 10:
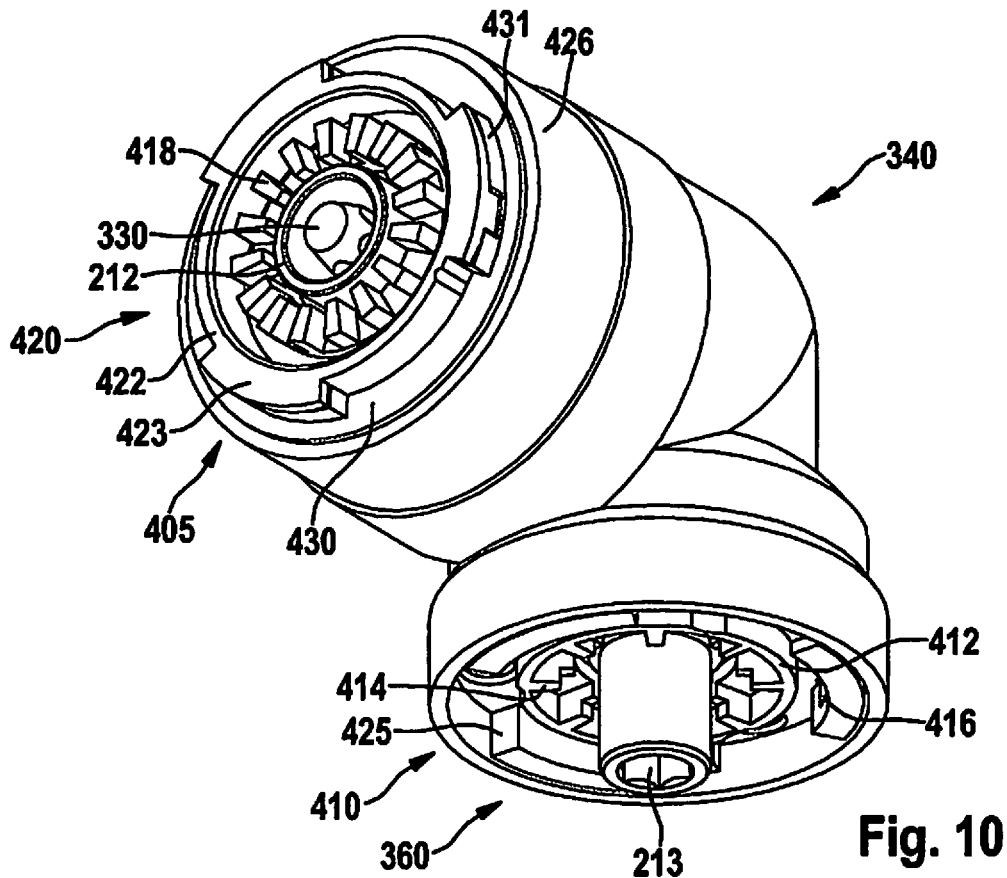
FIG. 10 shows a perspective view of a tool attachment together with a second interface element of the interface and an auxiliary interface.

In addition, FIGS. 5 and 10 illustrate another embodiment of the present invention, according to which tool attachment 340 also includes, in addition to second interface element 420, an auxiliary interface element 360 designed in the manner of first interface element 410 of hand-held power tool 300, so that an additional tool attachment 341 may be adapted to auxiliary interface 360, and it is thus possible to operate multiple tool attachments 340, 341 situated in succession on gear housing 320, each connected by bayonet-type connectors 405. In the illustrated case, first tool attachment 340 is a right angle tool holder, and additional tool attachment 341 is a drill chuck tool holder, illustrated only in FIG. 5. As is apparent in FIGS. 5 and 10, auxiliary interface element 360 is designed according to the specific embodiment of the present invention depicted in FIG. 3. It is also apparent in FIG. 5 that an input bearing bush 216 is provided on tool attachment 340. Input bearing bush 216 at its inner circumference accommodates input spindle 212 of tool attachment 340, and along its outer circumference is encompassed in sections by a centering sleeve 218 of input spindle 212 and by sections of the housing of tool attachment 340. In this way, simultaneous centering of the housing of tool attachment 340 and of interface 400 takes place due to input bearing bush 216.

Figure 6:
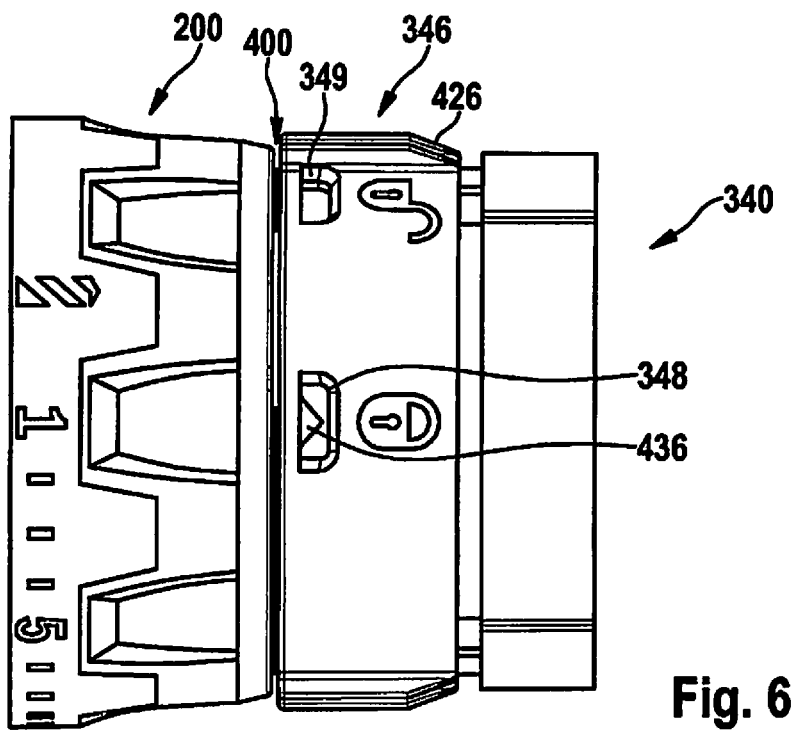
FIG. 6 shows a side view of the interface between a hand-held power tool and a tool attachment.

FIG. 6 illustrates a view of interface 400. A portion of gear 200 with an adjusting ring, not indicated in greater detail, for adjusting a torque is apparent on the left side, and a portion of tool attachment 340 with locking ring 426 is apparent on the right side. To provide the user with a quick overview of the locking state of bayonet-type connector 405, a indicating device 346 is provided which indicates the unlocked and locked locking states of bayonet-type connector 405, regardless of tool attachment 340 used, regardless of the angular position of tool attachment 340 with respect to gear housing 320, and regardless of the angular position of indicating device 346 of tool attachment 340 with respect to the remainder of tool attachment 340.

In the illustrated specific embodiment in FIG. 6, indicating device 346 includes a first indicating notch 348 and a second indicating notch 349 in locking ring 426, as well as a first symbol 436 on detent ring 430, in the present case the tip of an arrow, which is visible through the center of first indicating notch 348 only when detent element 424 of fastening ring 422 is engaged with first recess 432, and which is visible through the center of second indicating notch 349 only when detent element 424 of fastening ring 422 is engaged with second recess 434.

According to the above discussion in conjunction with FIG. 2, an engagement of detent element 424 of fastening ring 422 with first recess 432 means that bayonet-type connector 405 is in the locked locking state. This may be clarified for the user by an appropriate marking on first indicating notch 348, such as the symbol of a closed padlock illustrated in FIG. 6.

In contrast, an engagement of detent element 424 of fastening ring 422 with second recess 434 means that bayonet-type connector 405 is in the unlocked locking state. In the present specific embodiment, this is clarified for the user by the symbol of an open padlock, illustrated in FIG. 6, next to second indicating notch 349.

Figure 7:
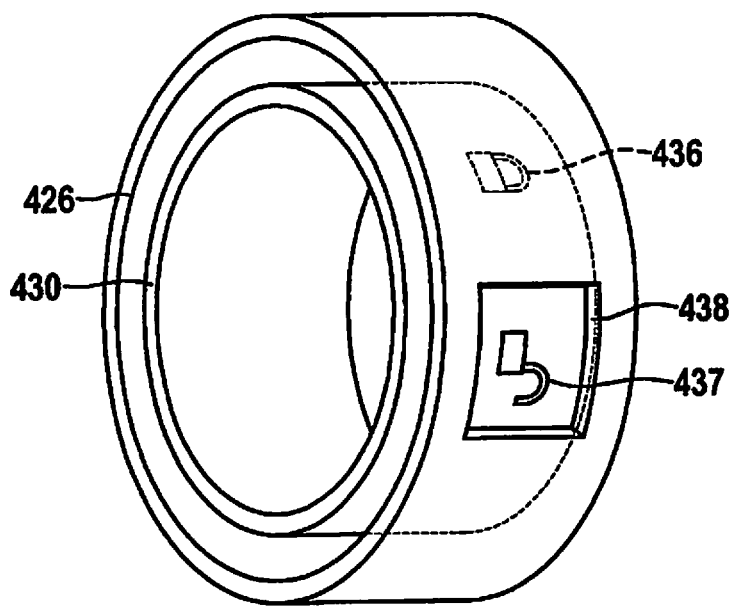
FIG. 7 shows by way of example a schematic perspective view of a locking ring together with a detent ring.

In one alternative specific embodiment illustrated in FIG. 7, indicating device 346 includes only first indicating notch 348 in locking ring 426, and for this purpose includes a second symbol 437 on detent ring 430 in addition to first symbol 436, first symbol 436 being visible through the center of first indicating notch 348 only when detent element 424 of fastening ring 422 is engaged with first recess 432, and second symbol 437 being visible through the center of indicating notch 348 only when detent element 424 of fastening ring 422 is engaged with second recess 434. In the specific embodiment illustrated in FIG. 7, first symbol 436 is a closed padlock and second symbol 437 is an open padlock, via which, as described above, the locked or the unlocked locking state, respectively, is indicated.

The present invention is not limited to the exemplary embodiment that is described and illustrated. Rather, it encompasses all refinements undertaken by those skilled in the art. Thus, the present invention may be used in numerous ways with cordless hand-held power tools and also with hand-held power tools that are provided with a grid power connection.

In addition to the specific embodiments described and illustrated, further specific embodiments are possible which may encompass further modifications and combinations of features.

What is claimed is:
1. A hand-held power tool, comprising:
a gear housing with a gear for transmitting a torque, generated by a drive motor, to a spindle that rotates about a rotation axis and defines an axial direction; and
a housing-side interface element, the gear housing being exchangeably connectable to a tool attachment via the housing-side interface element in such a way that a torque is transmitted from the spindle to an input spindle of the tool attachment, the housing-side interface element including a flange ring that is connected to the gear housing in a torsionally stiff manner, and the housing-side interface element corresponding to a tool attachment-side interface element which includes a fastening ring that is rotatably supported on the tool attachment, the fastening ring being brought into engagement with the flange ring by a coupled rotatory and axial relative movement of the fastening ring with respect to the flange ring in such a way that the fastening ring and the flange ring together form a bayonet-type connector, wherein the flange ring has at least one beveled undercut that extends in a circumferential direction of the flange ring and has a variable slope.

2. The hand-held power tool as recited in claim 1, wherein the tool attachment-side interface element also includes a detent ring, the bayonet-type connector being locked by rotating the fastening ring with respect to the detent ring.

3. The hand-held power tool as recited in claim 2, wherein the detent ring and the fastening ring are rotatably supported on the tool attachment, and the housing-side interface element includes at least one fixing element that nonrotatably fixes the detent ring with respect to the flange ring when the fastening ring is engaged with the flange ring.

4. The hand-held power tool as recited in claim 2, wherein the detent ring has at least one first recess that cooperates with at least one corresponding detent element of the fastening ring in such a way that when the bayonet-type connector is set up, the detent element engages with the first recess at a defined rotation angle of the fastening ring with respect to the detent ring, thus achieving the locking of the fastening ring with respect to the detent ring.

5. The hand-held power tool as recited in claim 1, wherein the housing-side interface element includes at least one rib element that is brought into engagement with at least one corresponding detent lug of the tool attachment-side interface element in such a way that the tool attachment is nonrotatably fixed with respect to the gear housing when the bayonet-type connector is set up.

6. A hand-held power tool, comprising:
a gear housing with a gear for transmitting a torque, generated by a drive motor, to a spindle that rotates about a rotation axis and defines an axial direction; and
a housing-side interface element, the gear housing being exchangeably connectable to a tool attachment via the housing-side interface element in such a way that a torque is transmitted from the spindle to an input spindle of the tool attachment, the housing-side interface element including a flange ring that is connected to the gear housing in a torsionally stiff manner, and the housing-side interface element corresponding to a tool attachment-side interface element which includes a fastening ring that is rotatably supported on the tool attachment, the fastening ring being brought into engagement with the flange ring by a coupled rotatory and axial relative movement of the fastening ring with respect to the flange ring in such a way that the fastening ring and the flange ring together form a bayonet-type connector,
wherein the tool attachment-side interface element also includes a detent ring, the bayonet-type connector being locked by rotating the fastening ring with respect to the detent ring,
wherein the flange ring has at least one beveled undercut that extends in a circumferential direction of the flange ring and has a variable slope, at least one corresponding undercut element on the fastening ring engaging with the undercut in the manner of a bayonet joint when the bayonet-type connector is set up, and when a rotation of the fastening ring is applied, the undercut element being guided along the slope of the beveled undercut in such a way that an axial motion component of the fastening ring with respect to the flange ring is brought about in a first defined angular range of the rotation.

7. The hand-held power tool as recited in claim 6, wherein the fastening ring has at least one beveled second undercut that extends in the circumferential direction of the fastening ring and has a variable slope, at least one corresponding second undercut element on the flange ring engaging with the second undercut in the manner of a bayonet joint when the bayonet-type connector is set up, and when a rotation of the fastening ring is applied, the second undercut element being guided along the slope of the beveled second undercut in such a way that an axial motion component of the fastening ring with respect to the flange ring is brought about in a first defined angular range of the rotation.

8. The hand-held power tool as recited in claim 7, wherein the variable slope of the beveled undercut is designed in such a way that in a second defined angular range of the rotation, the rotation applied to the fastening ring does not bring about an axial motion component of the fastening ring with respect to the flange ring.

9. The hand-held power tool as recited in claim 8, wherein the detent ring has at least one second recess that cooperates with at least one detent element of the fastening ring in such a way that when the bayonet-type connector is released, the detent element engages with the second recess at a defined rotation angle of the fastening ring with respect to the detent ring, thus achieving anti-twist protection of the fastening ring with respect to the detent ring when the housing-side interface element and the tool attachment-side interface element are not engaged with one another.

10. The hand-held power tool as recited in claim 9, wherein the second defined angular range of the rotation corresponds to a range that extends from the engagement of the detent element with the first recess to a rotation of the fastening ring with respect to the detent ring about a defined rotation angle, and the first defined angular range of the rotation corresponds to the remaining rotation angles of the fastening ring with respect to the detent ring until the engagement of the detent element with the second recess.

11. A tool attachment for exchangeable connection to a hand-held power tool, comprising:
a tool attachment-side interface element that is exchangeably connectable to a housing-side interface element, the tool attachment-side interface element including a fastening ring that is rotatably supported on the tool attachment, wherein the fastening ring is brought into engagement with the housing-side interface element by a coupled rotatory and axial relative movement of the fastening ring with respect to the housing-side interface element in such a way that the fastening ring and the housing-side interface element together form a bayonet-type connector,
wherein the housing-side interface element includes a flange ring,
wherein the flange ring has at least one beveled undercut that extends in a circumferential direction of the flange ring and has a variable slope.

12. The tool attachment as recited in claim 11, wherein the housing-side interface element includes a flange ring that may be brought into engagement with the fastening ring by a coupled rotatory and axial relative movement of the fastening ring with respect to the flange ring in such a way that the fastening ring and the flange ring together form a bayonet-type connector.

13. The tool attachment as recited in claim 12, wherein the fastening ring is resiliently supported on the tool attachment in the axial direction, so that the housing-side interface element and the tool attachment-side interface element are axially braced against one another when the bayonet-type connector, and the associated axial relative movement between the fastening ring and the flange ring, are set up.

14. The tool attachment as recited in claim 13, wherein the resilient support takes place via at least one of an elastomer element and a spring.

15. The tool attachment as recited in claim 11, wherein the tool attachment-side interface element includes a detent ring, the bayonet-type connector being lockable by rotating the fastening ring with respect to the detent ring.

16. The tool attachment as recited in claim 15, wherein an indicating device is provided on the tool attachment, which indicates unlocked and locked locking states of the bayonet-type connector, regardless of the tool attachment used, regardless of the angular position of the tool attachment with respect to the gear housing, and regardless of the angular position of the indicating device of the tool attachment with respect to a remainder of the tool attachment.

17. The tool attachment as recited in claim 11, wherein the rotation of the fastening ring takes place via a locking ring that is supported on the tool attachment concentrically with respect to the fastening ring and rotatably fixedly connected to the fastening ring.

18. The tool attachment as recited in claim 11, wherein a detent lug of the tool attachment-side interface element is connected to the fastening ring via a spring element in such a way that the detent lug is pretensioned against the housing-side interface element.

19. The tool attachment as recited in claim 18, wherein the spring element is a coil spring that is designed as a compression spring or tension spring.

20. The tool attachment as recited in claim 11, wherein the tool attachment is one of: (i) a drill chuck tool holder, (ii) a right angle tool holder, (iii) an eccentric tool holder, (iv) a drill bit holder attachment, (v) a rotary percussion drill attachment, (vi) an impact drill attachment, (vii) a drill hammer attachment, or (viii) a torque attachment.

21. The tool attachment as recited in claim 11, wherein the tool attachment includes an auxiliary interface element designed in the manner of the housing-side interface element of the hand-held power tool, so that an additional tool attachment may be adapted at the auxiliary interface so that it can operate multiple tool attachments situated in succession on the gear housing and connected to one another by bayonet-type connectors.

22. The tool attachment as recited in claim 11, wherein an input bearing bush is provided on the tool attachment, the input bearing bush at its inner circumference accommodating an input spindle of the tool attachment, and along its outer circumference being encompassed in sections by a centering sleeve of the input spindle and by sections of a housing of the tool attachment, so that simultaneous centering of the housing of the tool attachment and of an interface takes place due to the input bearing bush.

23. A tool attachment for exchangeable connection to a hand-held power tool, comprising:
a tool attachment-side interface element that is exchangeably connectable to a housing-side interface element, the tool attachment-side interface element including a fastening ring that is rotatably supported on the tool attachment, wherein the fastening ring is brought into engagement with the housing-side interface element by a coupled rotatory and axial relative movement of the fastening ring with respect to the housing-side interface element in such a way that the fastening ring and the housing-side interface element together form a bayonet-type connector,
wherein the tool attachment-side interface element includes a detent ring, the bayonet-type connector being lockable by rotating the fastening ring with respect to the detent ring,
wherein an indicating device is provided on the tool attachment, which indicates unlocked and locked locking states of the bayonet-type connector, regardless of the tool attachment used, regardless of the angular position of the tool attachment with respect to the gear housing, and regardless of the angular position of the indicating device of the tool attachment with respect to a remainder of the tool attachment,
wherein the indicating device includes a first indicating notch and a second indicating notch in the locking ring, and a first symbol on the detent ring which is visible through the center of the first indicating notch only when a detent element of the fastening ring is engaged with a first recess, and which is visible through the center of the second indicating notch only when the detent element of the fastening ring is engaged with a second recess.

24. A tool attachment for exchangeable connection to a hand-held power tool, comprising:
a tool attachment-side interface element that is exchangeably connectable to a housing-side interface element, the tool attachment-side interface element including a fastening ring that is rotatably supported on the tool attachment, wherein the fastening ring is brought into engagement with the housing-side interface element by a coupled rotatory and axial relative movement of the fastening ring with respect to the housing-side interface element in such a way that the fastening ring and the housing-side interface element together form a bayonet-type connector,
wherein the tool attachment-side interface element includes a detent ring, the bayonet-type connector being lockable by rotating the fastening ring with respect to the detent ring,
wherein an indicating device is provided on the tool attachment, which indicates unlocked and locked locking states of the bayonet-type connector, regardless of the tool attachment used, regardless of the angular position of the tool attachment with respect to the gear housing, and regardless of the angular position of the indicating device of the tool attachment with respect to a remainder of the tool attachment,
wherein the indicating device includes a first indicating notch in the locking ring, and a first symbol and a second symbol on the detent ring, the first symbol being visible through the center of the first indicating notch only when a detent element of the fastening ring is engaged with a first recess, and the second symbol being visible through the center of the first indicating notch only when the detent element of the fastening ring is engaged with a second recess.

25. A tool system, comprising:
a hand-held power tool including a gear housing with a gear for transmitting a torque, generated by a drive motor, to a spindle that rotates about a rotation axis, the spindle defining an axial direction, the gear housing being exchangeably connectable to a tool attachment via an interface in such a way that a torque is transmitted from the spindle to an input spindle of the tool attachment, the interface including a housing-side interface element with a flange ring, the flange ring being connected to the gear housing in a torsionally stiff manner, and the housing-side interface element corresponding to a tool attachment-side interface element which includes a fastening ring that is rotatably supported on the tool attachment, the fastening ring being brought into engagement with the flange ring by a coupled rotatory and axial relative movement of the fastening ring with respect to the flange ring in such a way that the fastening ring and the flange ring together form a bayonet-type connector; and the tool attachment, wherein the flange ring has at least one beveled undercut that extends in a circumferential direction of the flange ring and has a variable slope.

26. The tool system as recited in claim 25, wherein the tool attachment-side interface element includes a detent ring, the bayonet-type connector being locked by rotating the fastening ring with respect to the detent ring.

27. The tool system as recited in claim 25, wherein the housing-side interface element includes at least one rib element that is brought into engagement with at least one corresponding detent lug of the tool attachment-side second interface element in such a way that the tool attachment is nonrotatably fixed with respect to the gear housing when the bayonet-type connector is set up.

28. The tool system as recited in claim 27, wherein in a locked state of the bayonet-type connector, the tool attachment may be pulled away from the gear housing in the axial direction, against the pretensioning force of a spring element, so that the engagement between the detent lug and the rib element is discontinued and a rotation of the tool attachment with respect to the gear housing is made possible.

* * * * *